A. J. FERRIS.
TIRE HOLDER.
APPLICATION FILED FEB. 24, 1916.
1,349,270.
Patented Aug. 10, 1920.
4 SHEETS—SHEET 2.
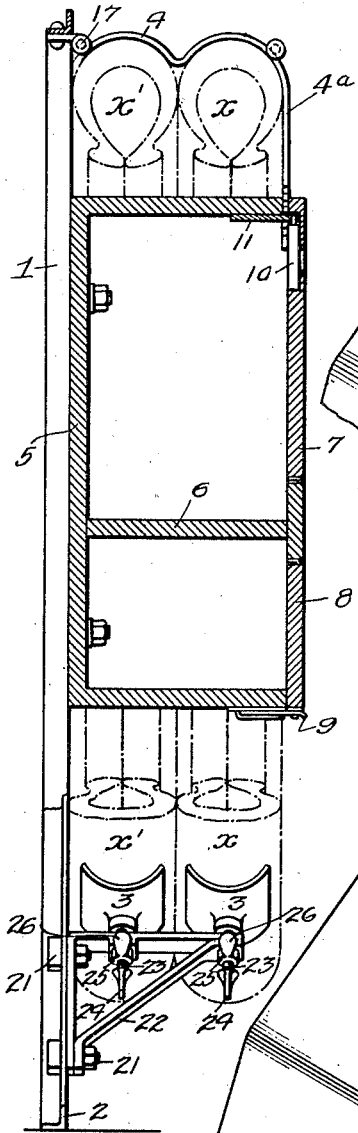
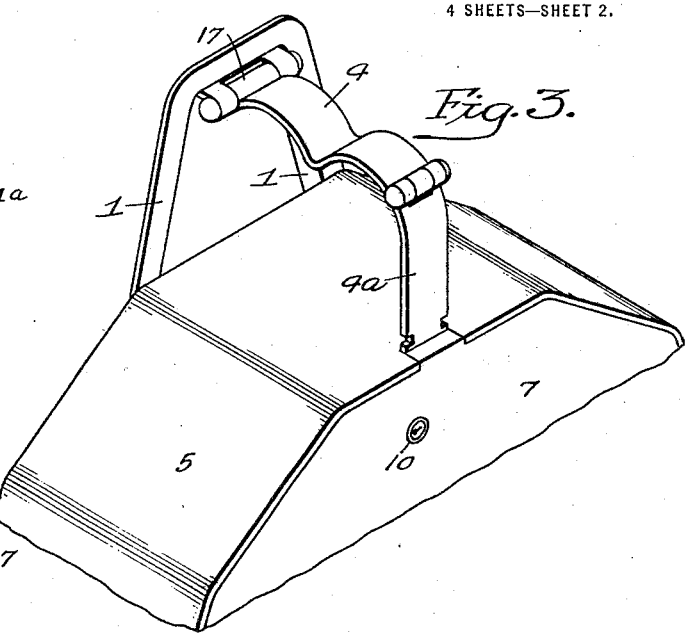
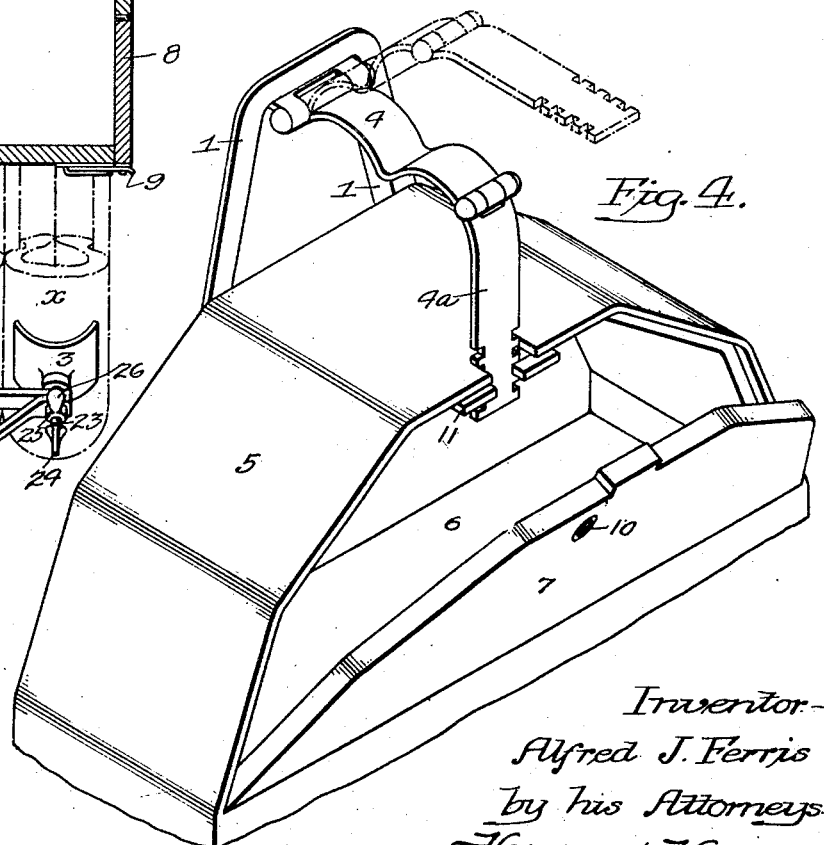
Inventor—
Alfred J. Ferris
by his Attorneys
Howson & Howson

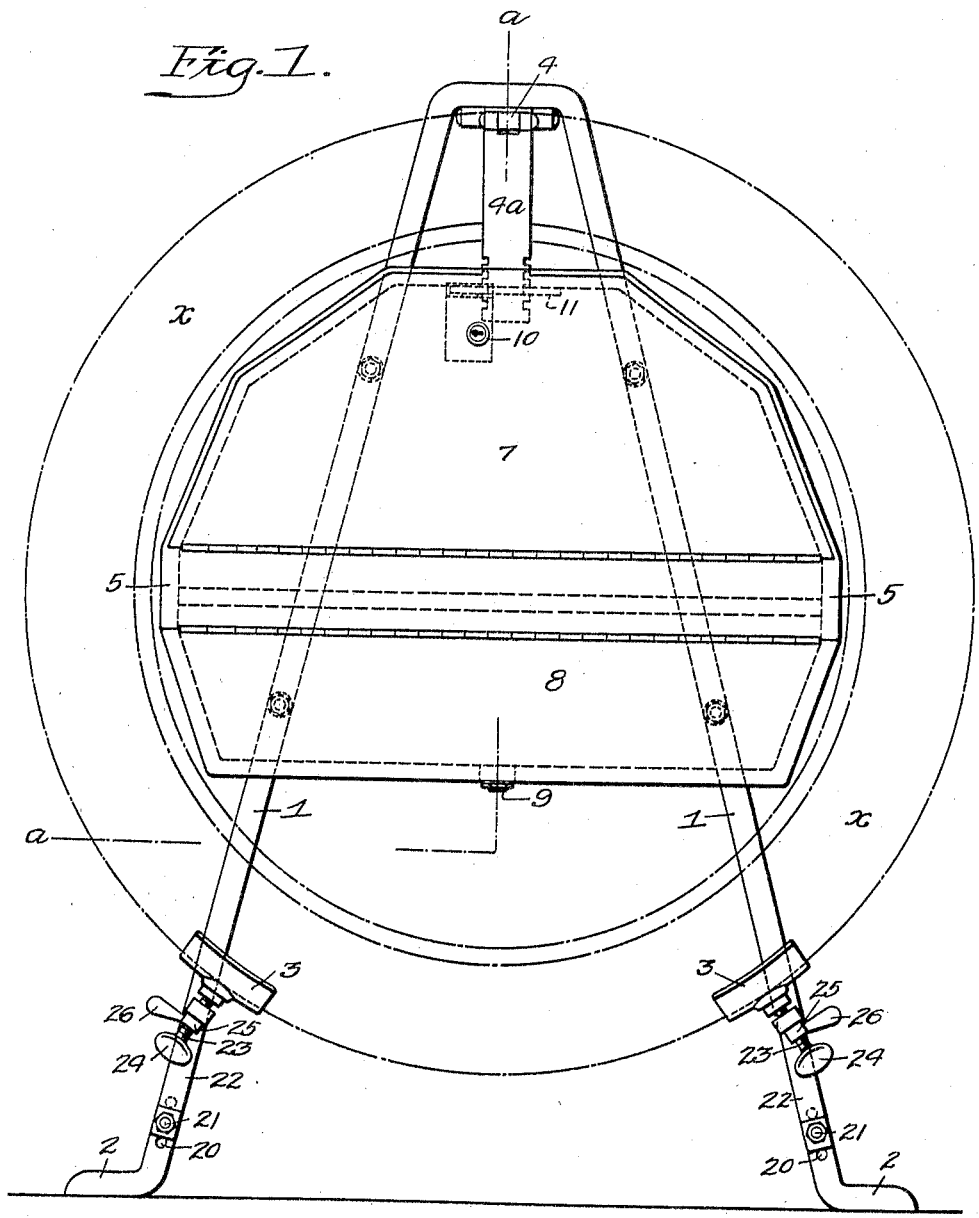

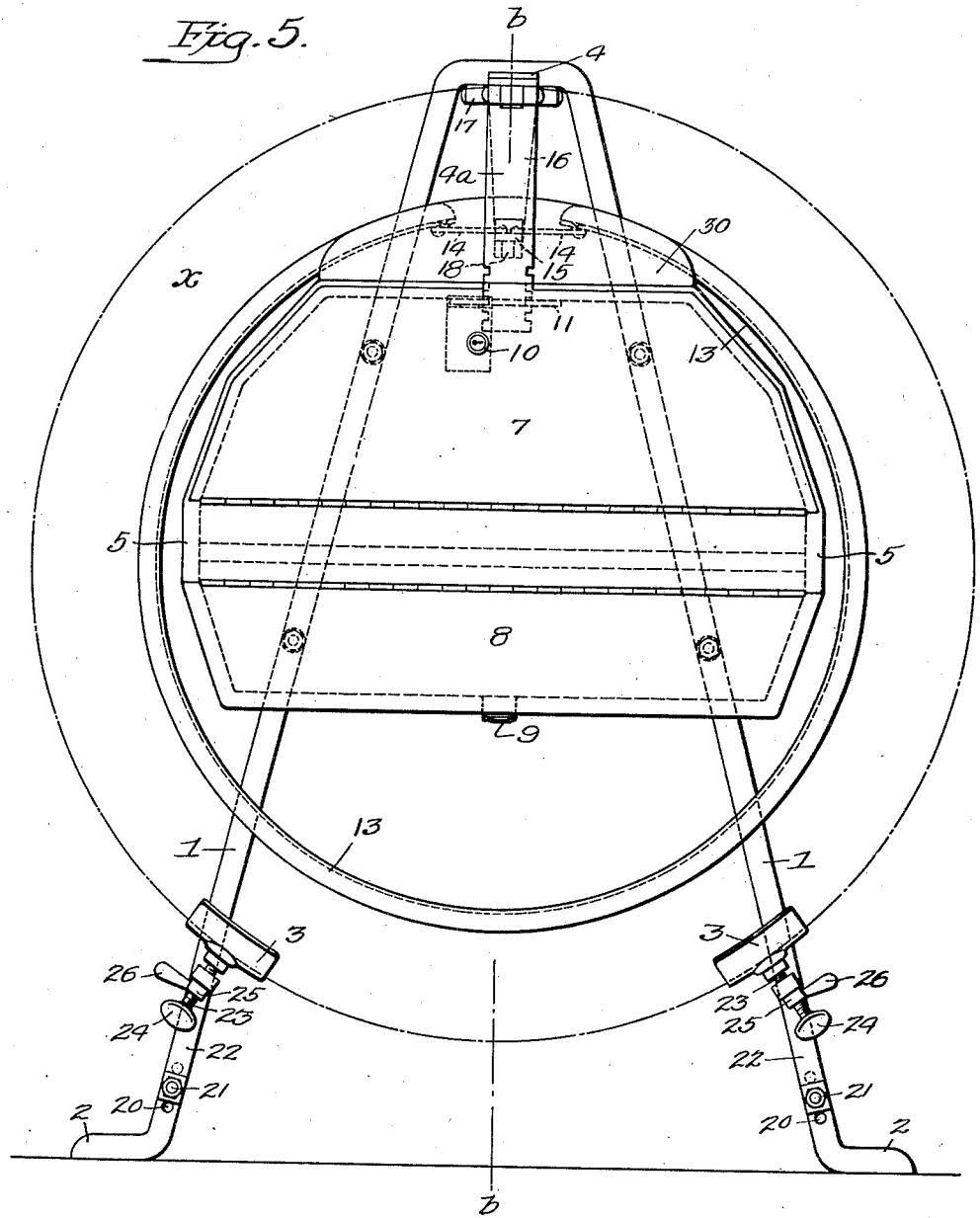

A. J. FERRIS.
TIRE HOLDER.
APPLICATION FILED FEB. 24, 1916.
1,349,270.
Patented Aug. 10, 1920.
4 SHEETS—SHEET 4.
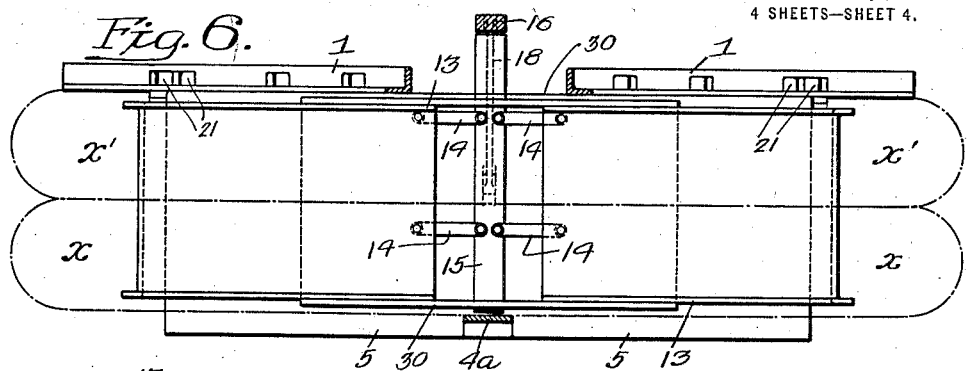
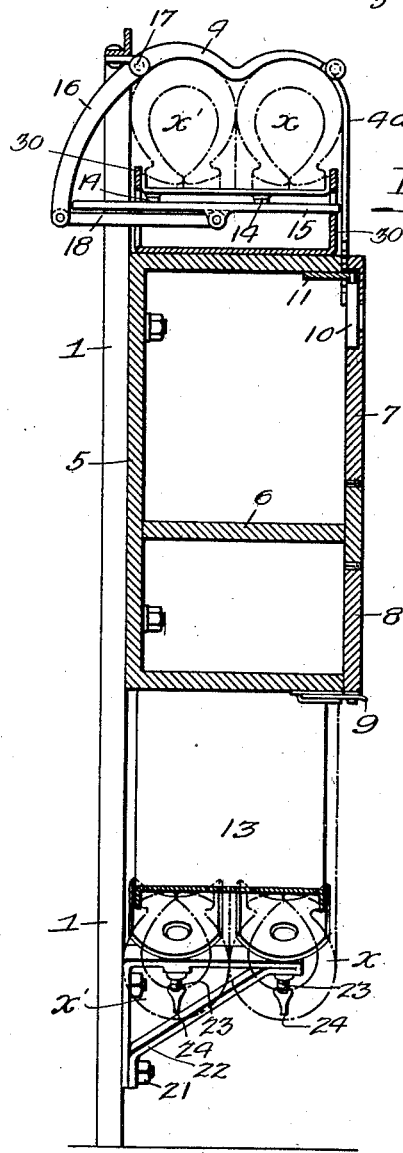
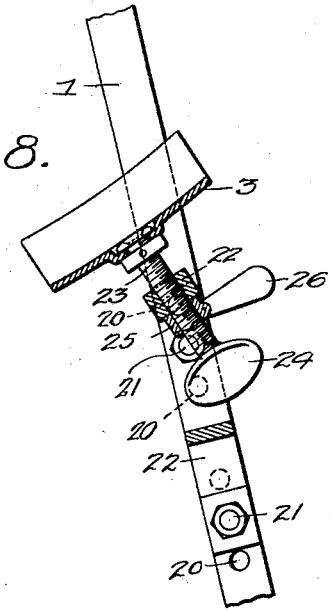
Inventor-
Alfred J. Ferris
by his Attorneys
Howson & Howson

UNITED STATES PATENT OFFICE.

ALFRED J. FERRIS, OF PHILADELPHIA, PENNSYLVANIA.

TIRE-HOLDER.

1,349,270.  Specification of Letters Patent.  Patented Aug. 10, 1920.

Application filed February 24, 1916. Serial No. 80,223.

*To all whom it may concern:*

Be it known that I, ALFRED J. FERRIS, a citizen of the United States, residing in Philadelphia, Pennsylvania, have invented Tire-Holders, of which the following is a specification.

One object of this invention is to provide a convenient, inexpensive and relatively substantial combination of parts for supporting one or more tire shoes or inflated tires fastened upon demountable rims, either with or without a box which may be utilized for the reception of tools, etc.;—the arrangement of parts being such that the shoes are effectually locked from removal and are at the same time so supported and engaged as to be prevented from movement upon their support.

Another object of the invention is to provide a novel arrangement of parts for supporting one or more tire shoes upon the body or frame of a vehicle which shall include conveniently adjustable means for effectually locking the shoes in place and so holding them that they shall not be free to move upon their support.

I further desire to provide a combined tool-box and tire-shoe-supporting structure with a device for locking the shoes in place which shall itself be retained in its locking position by the door or closure of said tool box.

These objects and other advantageous ends I secure as hereinafter set forth, reference being had to the accompanying drawings, in which—

Figure 1 is a front elevation illustrating a simple form of my invention;

Fig. 2 is a central vertical section of the structure shown in Fig. 1, taken on the line *a—a*, Fig. 1.

Figs. 3 and 4 are fragmentary perspective views showing the tire-locking member in its closed and in its released positions respectively.

Figs. 5 and 6 are respectively a front elevation and a plan partly in section, illustrating a modified form of my invention;

Fig. 7 is a section on the line *b—b*, Fig. 5; and

Fig. 8 is a vertical section on an enlarged scale illustrating the preferred construction of one of the adjustable cradles.

In the above drawings, 1 represents a suitable metallic frame work which in the present instance is shown as a length of structural section such as angle iron, having the form of an inverted V, the ends 2 of its branches being preferably extended in opposite directions to form feet by which it may be rigidly connected to a support such as the running board, body or frame of a motor vehicle. Said frame 1 is likewise connected to the body of the vehicle at one or more other points so that it is rigidly held in position. Each of the branches of the frame adjacent its lower end has adjustably mounted on it an angle bracket 22 held in place by bolts 21 which may be placed in any of a number of holes in said frame, and as shown in Fig. 8, the horizontally extending member of each of these angle brackets has threaded in it a pair of bolts 23 having winged heads 24 and swiveled to concave shoe-engaging plates or brackets 3, which by means of said bolts may be moved up or down at will to cause them to raise or lower the shoes engaging them. Jam nuts 25 are preferably placed on each of the bolts 23 and are made with projecting handles 26 to facilitate their manual adjustment.

The frame likewise has hinged to its top or upper portion a keeper 4 illustrated as made of substantially L-shape and in two parts of which the outer part 4ª has its free end slotted inwardly from both edges as shown in Figs. 3 and 4. The main or inner part of this keeper is bent downwardly adjacent its middle so that it will be capable of closely engaging either or both of two tire shoes and the outer part 4ª is hinged to said first part to permit it to be locked in position as hereafter noted. Also rigidly fixed to and carried by the supporting frame 1 is a tool box 5 designed to fit within or be surrounded by the shoes *x* and *x'*, its outline conforming to a greater or less extent to that of the space within the shoes and its thickness or depth from front to rear being preferably slightly more than the combined transverse thickness of said two tire shoes.

While this box may be of any suitable construction, I preferably make it with a transverse substantially horizontal partition 6 whereby it is divided into two compartments or chambers respectively provided with outwardly swinging doors 7 and 8, the lower door or closure being hinged along its upper edge, and normally held in its closed position by a spring latch 9. The upper door 7 is hinged along its lower edge, and is preferably provided with a lock 10 whose bolt is designed to engage a keeper or hasp 11, fixed to the inner face of the front top edge of the box.

From Figs. 3 and 4 it will be noted that the part 4ª of the locking member 4 for the tire shoes is of such length that its free end may enter a slot in the outer end of the hasp or keeper 11 which in turn fits into a pair of the oppositely placed slots in the edges of said locking member. The upper portion of the box against which said cover 7 closes has a vertical slot into which the locking member 4ª fits when the former is in its closed or locked position and said member is so formed that when the tire shoes $x$ and $x'$ are mounted in their brackets 3, it may be drawn around them into the position shown in Fig. 2, after which its slotted end may be engaged with the keeper 11. Thereafter when the door or cover 7 is moved to its closed position and locked, this locking member 4 with the tire shoes is effectually held against movement and also against removal, its length and form being such that it so closely engages the tire shoes $x$ and $x'$ as to effectually hold them from movement.

The relative dimensions of the tool box and brackets 3 are such that when the locking member 4 is released by the opening of the door 7 and disengaging of its part 4ª from the keeper 11, the tire shoes may be easily removed or replaced. Said shoes may thus be held from unauthorized removal without the necessity for special cases or straps, while the single operation of opening the door 7 of the main part of the tool box automatically serves to release the shoe locking member.

While I preferably employ the tool box in conjunction with the tire locking means above described, it may obviously be omitted without departing from my invention. As shown in Figs. 5 to 7 inclusive, I may support the tire shoes or demountable rims with tires either partially or wholly on a flanged ring 13. In such case I preferably make said ring in split form with a portion adjacent the top removed, and connect one or more pairs of toggle links 14 to the two resulting edges or ends which are slidably guided by a flanged plate 30 mounted on the tool box or otherwise suitably supported. Each pair of these links in turn is connected to a link or bar 15 extending transversely of the ring 13 between its ends and connected through a link 18 to an arm 16 forming part of or rigidly connected to the locking or retaining member 4. As before, this latter is fulcrumed or hinged to the frame 1 by a pin 17 and is designed to have its free end 4ª adjustably locked in any suitable manner so as to tightly grip the tire shoes.

With this arrangement of parts the drawing down of the shoe locking member shown in Figs. 5 to 7 inclusive, into a position to engage the tires, causes the free end of the arm 16 to move outwardly and through the links 18 and 15 to straighten the toggle links of each pair. The adjacent ends of the tire or shoe supporting ring are thus forced to and held in their spread positions, effectually preventing movement of the tire shoes or rims, which are also closely gripped by the locking member 4. The parts are so designed that the change of diameter of the ring 13 due to the "breaking" of the toggles when the locking or retaining member 4 is moved upwardly on its pivot, will reduce the diameter of the ring sufficiently to allow of the removal of the tire shoes over its flanges.

If desired the brackets 3 may be used in connection with the ring and its associated parts though they are usually omitted. In any case their positions may be adjusted to cause the tire shoes to be immovably gripped by the locking member 4—4ª with any desired pressure by turning the bolts 23 until the several parts occupy the positions necessary to attain this end. For a greater range of adjustment, the angle brackets 22 may be set up or down on the frame 1 as required. The shoes or demountable rims with tires thereon are thus immovably held to the frame 1 and may be securely locked in place although capable of being quickly and conveniently removed by unlocking the member 4ª.

It is to be understood that either the brackets 4, the expansible ring 13, or any equivalent device constitute a cradle for supporting the tire shoe or shoes and in all instances it is to be noted that a shoe is held by said cradle preferably though not necessarily at its lower portion and rigidly gripped by the hasp at its upper portion so as to be prevented from movement.

I claim:—

1. The combination of a supporting structure; a tool box thereon; a cradle placed to engage a portion of a tire shoe extending around the tool box; a hasp hinged to said structure and made in a plurality of parts hinged together to rigidly grip the tire shoe in the cradle; with common locking means holding the box closed and the hasp in position.

2. The combination of a supporting structure; a cradle thereon mounted to support a tire shoe; a box mounted on the structure in position to lie within the shoe carried by the cradle and including a cover; a shoe gripping member made in a plurality of relatively movable parts and formed to be held in a locking position by the cover of the box; and means for holding said cover in its closed position with the shoe locking member in position to rigidly lock the shoe in place.

ALFRED J. FERRIS.